July 30, 1957  E. D. CAMPBELL ET AL  2,801,157
PROCESS AND FURNACE FOR THE PRODUCTION OF CARBON BLACK
Filed March 31, 1955  2 Sheets-Sheet 1

INVENTORS
Ernest D. Campbell
& George F. Friauf.

United States Patent Office 2,801,157
Patented July 30, 1957

2,801,157

PROCESS AND FURNACE FOR THE PRODUCTION OF CARBON BLACK

Earnest D. Campbell, Big Spring, and George F. Friauf, Pampa, Tex., assignors to Godfrey L. Cabot, Inc., Boston, Mass., a corporation of Massachusetts Application March 31, 1955, Serial No. 498,179

8 Claims. (Cl. 23—209.4)

This invention comprises a novel process of producing carbon black from an oil "make" material combined with a gas auxiliary fuel, and includes within its scope the new and improved furnace and burner arrangement by which the process may be conveniently carried out.

In general the objects of the invention are to provide a furnace process which may be relied upon to operate in a steady and uniform manner without objectionable pulsations, and at the same time having a convenient provision for controlling the character of the product in respect to its oil absorption and other characteristics when used in rubber compounding.

In many furnaces as heretofore constructed, serious operating trouble has been encountered by vibration and pulsation. Premixing of air and gas is desirable because it accelerates combustion, giving a higher heat release in a given time, and this accelerated combustion increases the capacity of a furnace. However, when premixing of air and gas occurs in the furnace throat, uneven burning usually results due to a wide variation in the velocity of the mixture issuing from the throat into the furnace. In zones of low velocity, lower than the rate of flame propogation of the mixture, flash-back occurs in varying degrees of intensity which sets up combustion vibration or pulsation. The resultant pulsating flow of the low pressure air into the furnace affects its accurate measurement. Under such conditions it is very difficult to control the quality of the carbon black product. Continued pulsation eventually damages the furnace brickwork, and in addition, other equipment is subjected to considerable strain, such as the horizontal and vertical coolers and the precipitator inlets.

We have discovered that premixing of air and gas can be done in the furnace throat without the difficulties outlined above, and close control of the product facilitated by delivering a series of gas jets spaced in a ring about the injection nozzle and discharging at points located between the oil nozzle and the gas discharge outlets associated therewith. For example, three or more pipe nipple burners are directed into the furnace throat and arranged to converge toward the center line of the combustion chamber. The gas jets discharged by these nipples insure a desirable and uniform air-gas mixture and at the same time produce a more uniform velocity condition within the throat, resulting in an improved flame pattern and point of ignition as compared to those found in processes heretofore known. In general it seems desirable to introduce gas at as many different points as possible into the furnace throat, and the design of the main burner with its outwardly directed jets together with the provision of pipe nipples as above explained is in line with this theory of operation.

We have found that location of introduction and velocity of gas flow are important in controlling the quality of the product. By increasing the ratio of gas admitted by the nipples to the gas admitted by the main burner, the oil absorption characteristic of the product is reduced as well as its modulus in rubber compounds. The reverse is also true and thus we have provide a simple and positive control of quality which has not been available in the past. Shorter or longer pipe nipples may be used in accordance with the results desired, and while optimum conditions have been secured by directing the gas jets convergently toward the center line of the combustion chamber, the nipples may be directed slightly countercurrent to the rotation of the main air-gas mixture should a product of slightly lower quality be desired for the time being.

These and other features and characteristics of the invention will be best understood and appreciated from the following description of a preferred manner of carrying out our novel process in connection with our improved furnace structure as shown in the accompanying drawings in which.

Figure 1:
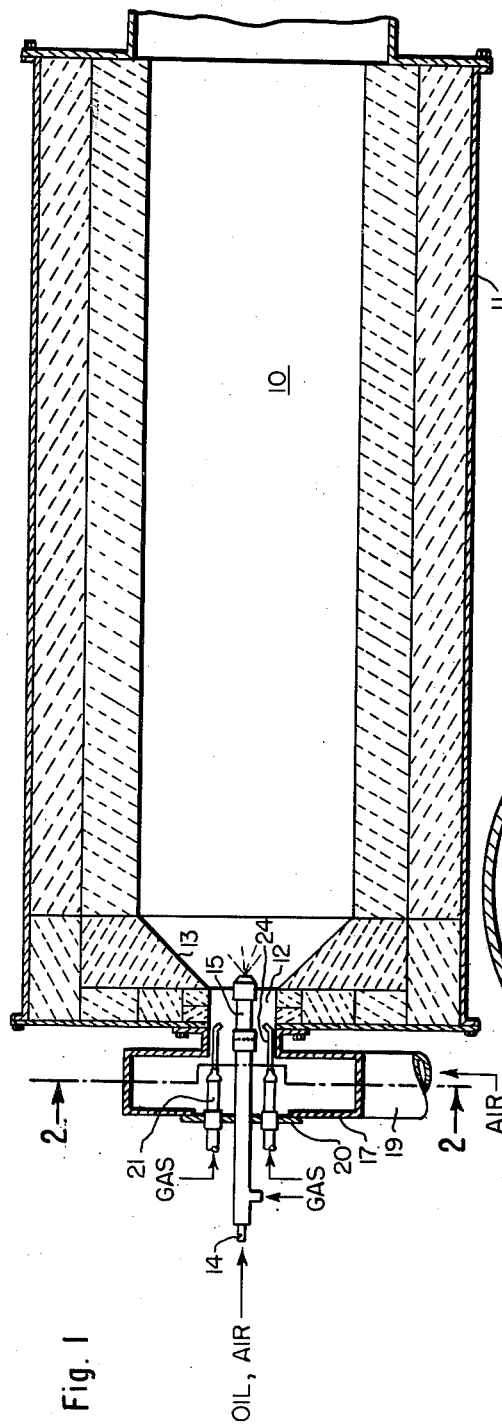
Fig. 1 is a view in longitudinal section of the furnace.
Figure 2:
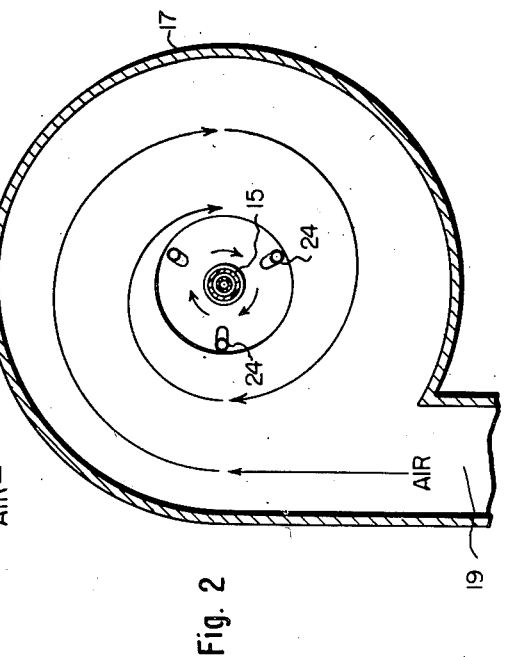
Fig. 2 is a view in cross section of the air header on the line 2—2 of Fig. 1.
Figure 3:
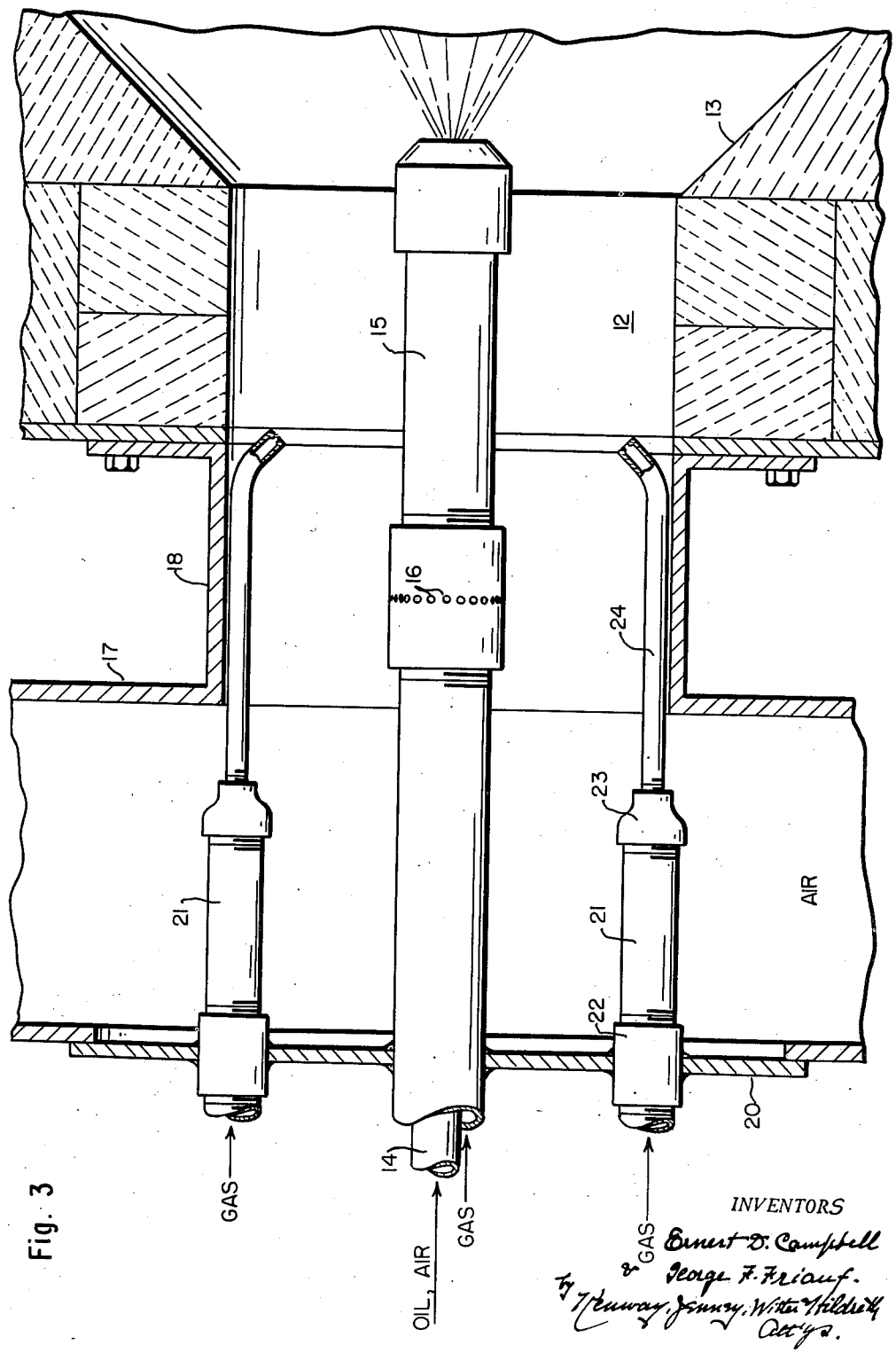
Fig. 3 is a view in elevation, partly in section, of the furnace throat and adjacent parts.

In its general organization and construction the furnace comprises an elongated cylindrical reaction chamber 10 of brick work enclosed in a steel casing 11. The furnace has an inlet throat 12 of restricted diameter that communicates with the reaction chamber through a short section having divergent walls 13.

Arranged concentrically in the throat 12 is a combined nozzle for gas and oil having an inner pipe 14 through which oil is forced and delivered as a conical spray into the reaction space in either liquid or vaporized condition. The nozzle includes an outer duct or pipe 15 for hydrocarbon fuel gas and this is delivered as one component of the air-gas mixture through a ring of outwardly directed orifices 16 located in the nozzle some distance upstream from its inner end.

A sheet metal header 17 of spiral contour is secured to the inlet end of the furnace through the medium of a flanged duct 18 herein shown as of the same internal diameter as the throat 12 of the furnace and disposed concentrically therewith. Air is delivered to the header through a tangential duct 19. The air thus has imparted to it a whirling motion and passes inwardly through the throat 12 to the reaction space where it encloses the oil spray issuing from the nozzle. The construction heretofore described is more or less standard equipment in the industry and the present invention consists in improvements in the construction and operation of this apparatus.

The header 17 is provided in its outer face with a circular aperture closed by a cover plate 20 centrally perforated to receive the nozzle 15. A plurality of burner pipe nipples 21 are secured to the cover plate 20 disposed in a ring concentric with respect to the nozzle 15 and the furnace throat 12, and these nipples are uniformly spaced from each other. As herein shown there are three burner nipples, but any convenient number may be employed in accordance with the requirements of the particular conditions encountered in practice. The burner nipples are herein shown as threaded into collars 22 which in turn are welded to the cover plate 20 and which thus provide convenient means for longitudinal adjustment of the nipples 21. As herein shown the nipples extend approximately two-thirds through the air header 17 and are provided with reducing couplings 23 from which project burner tips 24 of reduced diameter. These burner tips extend through the duct 18 and converge at their delivery ends into the furnace throat 12, toward the center line thereof and toward the nozzle 15. The stationary nipples 21 act to some extent to baffle and create turbulence in the air current in the header 17 and as it passes into the throat 18.

An alternative arrangement that might be used but is not shown, is to provide stuffing boxes on the cover plate 20 for the nipples 21, thus providing a convenient means for longitudinal adjustment of the burner tips 24.

In carrying out the process of our invention, a whirling current of air is directed by the header 17 into the confined throat 12 and then into the reaction space of the furnace. Fuel gas is injected outwardly into the air current from the orifices 16 and simultaneously fuel gas jets from the burner tips 24 are directed convergently into the whirling air-gas mixture thus provided. The gas jets from burner tips 24 provide additional turbulence insuring uniform mixing of the combustible components and produce a more uniform velocity condition within the throat. At the same time the "make" material is introduced axially into the reaction space through the inner pipe 14 of nozzle 15 in the form of an atomized or vaporized conical oil spray. The result is a whirling blanket of air-gas mixture, surrounding the oil spray, and burning without objectionable pulsation. The relative rates of oil, atomizing air (if used), air and gas are adjusted to produce the desired quality of carbon black produced.

An unexpected result is the precise control of the quality of the product that may be realized by varying the ratio of gas admitted through the tips 24 to that admitted through the orifices 16 as described above.

Having disclosed our invention and described illustrative apparatus and procedure, we claim as new and desire to secure by Letters Patent:

1. The process of making carbon black, which comprises the steps of injecting an oil spray into a combustion space, surrounding the oil spray with a whirling burning mixture of air and fuel gas, and directing into the said mixture a plurality of fuel gas jets disposed in a ring and all converging toward the axis of the whirling mixture.

2. The process defined in claim 1 in which approximately 70% of the gas used in the process is supplied by the mixture and approximately 30% by the ring of jets.

3. The process of making carbon black, comprising the steps of directing a whirling current of air into a confined throat and baffling the air current therein by a series of burner pipe nipples disposed concentrically in a ring in the throat, injecting fuel gas into the air current from outwardly directed orifices located within the throat, injecting an oil spray into a reaction space communicating with the throat, and, at a point between the oil spray and the said outwardly directed orifices, directing fuel gas jets convergently toward the center line of the throat.

4. The process defined in claim 3 further characterized by supplying approximately 70% of all the gas used in the process from the outwardly directed orifices and approximately 30% of the gas from the convergent gas jets.

5. The process of making carbon black which comprises the steps of injecting an oil spray into a cylindrical reaction space, surrounding the oil spray with a moving mixture of air and gas, and directing into said moving mixture a plurality of fuel gas jets spaced in a ring concentrically with respect to and substantially outside the center line of the oil spray and having a countercurrent component of movement to the main stream of air-gas mixture.

6. The process defined in claim 5 further characterized by the step of varying the ratio of gas supplied by the mixture to the gas supplied by the ring of jets in controlling the quality of product.

7. A furnace for the production of carbon black comprising an elongated cylindrical combustion chamber having an inlet wall apertured to provide a centrally disposed throat, an injection nozzle concentrically disposed in the throat for delivering an atomized spray of oil to the combustion chamber, and a series of auxiliary pipe nipple gas burners spaced in a ring at a distance from said nozzle, all being directed into the furnace throat and converging toward the center line of the combustion chamber.

8. A furnace for the production of carbon black comprising an elongated combustion chamber having an end wall apertured to provide an inlet throat of reduced diameter, an oil injection nozzle passing centrally through the throat and located to discharge into the combustion space, a concentric pipe apertured to discharge fuel gas at a point upstream from the oil spray discharged by the nozzle, and a series of pipe nozzles disposed in a circle adjacent to the inner wall of the throat at a distance from said concentric pipe and being directed inwardly toward the nozzle in convergent relation.

References Cited in the file of this patent

UNITED STATES PATENTS

| | | |
|---|---|---|
| 2,124,175 | Zink | July 19, 1938 |
| 2,625,466 | Williams | Jan. 13, 1953 |
| 2,672,402 | Stokes | Mar. 16, 1954 |
| 2,702,743 | Totzek | Feb. 22, 1955 |